US007804611B2

(12) United States Patent
Castellani

(10) Patent No.: US 7,804,611 B2
(45) Date of Patent: Sep. 28, 2010

(54) METHOD FOR REDIRECTING A PRINT JOB, NEGOTIATION APPARATUS, PRINTING SYSTEM, AND ARTICLE OF MANUFACTURE

(75) Inventor: Stefania Castellani, Meylan (FR)

(73) Assignee: Xerox Corporation, Norwalk, CT (US)

( * ) Notice: Subject to any disclaimer, the term of this patent is extended or adjusted under 35 U.S.C. 154(b) by 1105 days.

(21) Appl. No.: 11/318,745

(22) Filed: Dec. 27, 2005

(65) Prior Publication Data

US 2007/0146772 A1  Jun. 28, 2007

(51) Int. Cl.
 *G06F 3/12* (2006.01)
(52) U.S. Cl. .................................................... 358/1.15
(58) Field of Classification Search .................. 358/1.1, 358/1.2, 1.12, 1.14, 1.15
 See application file for complete search history.

(56) References Cited

U.S. PATENT DOCUMENTS

| | | | |
|---|---|---|---|
| 6,573,910 B1 | 6/2003 | Duke et al. | |
| 6,805,502 B2 | 10/2004 | Rai et al. | |
| 2002/0052824 A1* | 5/2002 | Mahanti et al. | 705/37 |
| 2003/0090697 A1 | 5/2003 | Lester et al. | |
| 2004/0083186 A1* | 4/2004 | Castellani et al. | 705/80 |
| 2004/0083187 A1 | 4/2004 | Andreoli et al. | |
| 2005/0108036 A1 | 5/2005 | Andreoli et al. | |
| 2005/0113107 A1 | 5/2005 | Meunier | |

OTHER PUBLICATIONS

U.S. Appl. No. 11/013,322, filed Dec. 15, 2004, Ciriza, et al.
U.S. Appl. No. 11/013,323, filed Dec. 15, 2004, Ragnet, et al.
J.-M. Andreoli, S. Castellani, M. Munier, "AllianceNet: Information Sharing, Negotiation and Decision-Making for Distributed Organizations", *Proc. of EcWeb 2000*, Greenwhich, U.K., Sep. 4-6, 2000 Available at: http://www.xrce.xerox.com/Publications/Attachments/1999-034/paper.pdf.gz.
J.-M Andreoli, S. Castellani, A. Grasso, J-L Meunier, M. Muehlenbrock, J. O'Neill, F. Ragnet, F. Roulland, D. Snowdon, "Augmenting Offices with Ubiquitous Sensing", Proceedings of the SOC 2003 Conference, Grenoble, France, May 15-17, 2003.
S. Castellani, J.-M. Andreoli, O. Boissier, M. Bratu, I. Alloul, K. Megzari, "E-Alliance: A Negotiation Infrastructure for Virtual Alliances", *Group Decision and Negotiation Journal on "e-negotiations"*, 12(2):127-141, Mar. 2003. Available at: http://www.xrce.xerox.com/Publications/Attachments/2002-030/eallianceGDN.pdf.

(Continued)

*Primary Examiner*—Benny Q Tieu
*Assistant Examiner*—Jeremiah A Bryar
(74) *Attorney, Agent, or Firm*—Fay Sharpe LLP

(57) ABSTRACT

A printing system includes printers capable of redirecting print jobs to one another. A negotiator associated with each printer negotiates print job redirections. If a printer is unable to execute a print job, the negotiator seeks to outsource the print job by communicating an outsource request to other negotiators. In formulating an outsource request, the negotiator utilizes one or more constraint services. A negotiator which receives the outsource request includes an insource mechanism which determines whether to make an offer in which the associated printer is to execute at least a portion of the print job to be outsourced. If negotiator determines to make the offer, the insource offer is communicated to the first negotiator. The negotiators may each contemporaneously conduct a plurality of negotiations for a particular print job to be outsourced and/or contemporaneously conduct a plurality of negotiations for different print jobs to be insourced.

22 Claims, 8 Drawing Sheets

OTHER PUBLICATIONS

Sadeh, "Micro-Opportunistic Scheduling: The Micro-Boss Factory Scheduler", *Intelligent Scheduling*, (*M. Zweben and M. Fox, Eds., Morgan Kaufmann Publishers*, San Francisco CA, 1994).

"Canon speeds up printing time with Callisto", 2003, http://www.canon.co.uk/about_us/news/solutions_business_news/callisto.asp.

HP/LBM Systems "ClusterQue", 2001, http://www.ClusterQue.com.

Konika Minolta, "Software Solutions. Cluster Printing. Konica Tandem and KPPM", 2004 http://konicaminolta.com.au/product_overview.aspx?p+37&id+14.

SMA-ENS Mines de Saint Etienne and CT-XRCE, "E-Alliance, inter-organisational alliances, Negotiation Facility Use Cases", E-alliance deliverable N2.2, Sep. 2003. (French version).

SMA-ENS Mines de Saint Etienne and CT-XRCE, "E-Alliance, inter-organisational alliances, Negotiation Facility Mock-up", E-alliance deliverable LN2.3, Sep. 2003.

J.-M. Andreoli, S. Castellani, "Constraint-based decision makers in negotiation processes", Proc. of the 2004 IFIP Int. Conf. on Decision Support Systems (DSS 2004), Prato, Tuscany, Italy, Jul. 1-3, 2004.

J.-M. Andreoli, O. Boissier, M. Bratu, S. Castellani, K. Megzari, I. Alloui, "E-Alliance: a software infrastructure for concurrent inter-organizational alliances", Proc. of ISPE Concurrent Engineering (CE)'02, Cranfield University, UK, Jul. 27-31, 2002.

Mihnea Bratu, Jean-Marc Andreoli, Olivier Boissier, Stefania Castellani, "A Software Infrastructure for Negotiation within Inter-Organisational Alliances", in Proc. of AAMAS'02 Workshop on Agent Mediated Electronic Commerce, Bologna, Italy, Jul. 16, 2002.

\* cited by examiner

METHOD FOR REDIRECTING A PRINT JOB, NEGOTIATION APPARATUS, PRINTING SYSTEM, AND ARTICLE OF MANUFACTURE

CROSS REFERENCE TO RELATED PATENTS AND APPLICATIONS

The following applications, the disclosures of which are incorporated herein in their entireties by reference, are mentioned:

U.S. application Ser. No. 10/065,491, filed Oct. 24, 2002, Pub. No. 2004/0083186, Apr. 29, 2004, entitled "SYSTEM FOR NEGOTIATION USING GRAPHS," by Stefania Castellani, et al.;

U.S. application Ser. No. 10/065,492, filed Oct. 24, 2002, Pub. No. 2004/0083187, Apr. 29, 2004, entitled "SYSTEM FOR NEGOTIATION WITH MIRRORING," by Jean-Marc Andreoli, et al.;

U.S. application Ser. No. 10/855,515, filed May 26, 2004, Pub. No. 2005/0108036, May 19, 2005; entitled "GRAPH-BASED NEGOTIATION SYSTEM WITH ENCAPSULATED CONSTRAINT SOLVER," by Jean-Marc Andreoli, et al.;

U.S. application Ser. No. 11/013,322, filed Dec. 15, 2004, entitled "AUTOMATED JOB REDIRECTION AND ORGANIZATION MANAGEMENT," by Victor Ciriza, et al.;

U.S. application Ser. No. 10/719,420 filed Nov. 21, 2003, Pub. No. 2005/0113107, May 26, 2005, entitled "METHOD FOR DETERMINING PROXIMITY OF DEVICES IN A WIRELESS NETWORK," by Jean-Luc Meunier; and U.S. application Ser. No. 11/013,323, filed Dec. 15, 2004, entitled "MULTIFUNCTION DEVICE WITH SECURE JOB RELEASE," by Francois Ragnet, et al.

BACKGROUND

The exemplary embodiment relates generally to negotiations between autonomous devices. It finds particular application in conjunction with negotiation of print job outsourcing in a cluster printing system and will be described with particular reference thereto.

Many companies now have computer networks in which several computers are capable of communicating with each other and with other devices on the network. In an office environment, a limited number of resources, typically printers, are shared among several office workers. Such networks derive cost benefits by shared usage of the printers. Exceptions and conflicts can arise during processes taking place in such environments when accessing those shared resources. For example, in situations in which a stand-alone printer malfunctions, it is typical for print jobs assigned to the printer not to be completed, even though available printing capacity may exist elsewhere in the network.

Network printing systems now exist which are configured for sending a print job to another printer when a printer to which a print job has been sent is, for some reason, not currently capable of performing the print job. When a user selects a non-functional printer for performing a print job, the user is often unaware that the printer has malfunctioned until the user walks over to the network printer that was given the print job. In some applications, the user is informed of a switch of the print job to the other printer (by e-mail or by web page notification), and can walk to the location of the other printer in order to pick up the print job when it is completed.

Negotiation has been used for the coordination of autonomous resources in distributed applications. Generic models exist which can specify and organize the interactions among the resource involved in a negotiation process (e.g., contract nets, auctions with their many variants, bi-lateral negotiations, etc.).

Different mechanisms exist which address the issue of making informed decisions relevant to a negotiation from the point of view of the individual resources that participate in a negotiation. The purpose of these decisions is primarily to make sure that the negotiation remains within the limits of a space of "authorized" solutions (the exact meaning of which is determined by the component making the decisions), and possibly also to orient the negotiation, within that space, towards some "optimal" solutions (again, in the sense of the component making the decisions).

Constraint solvers have been used to delimit the space of solutions authorized by a component in a negotiation. Generally, constraints may be used to express problems in a declarative way. Constraint solvers are generic tools capable of detecting constraint violations, but also inferring new constraints from existing ones. The basis for the cooperation between constraint solvers generally involves exchanging information linked to shared variables. This mechanism has been generalized and incorporated into generic agent argumentation systems typically for distributed problem solving. While constraint solvers are useful, generic tools capable of automating some of the processes taking place in negotiation based applications, their integration in such applications requires some form of encapsulation to turn them into effective negotiators capable of fully taking part in a negotiation process. Constraint solvers have been used to delimit the space of solutions by a component in a negotiation in a prescriptive way by specifying the situations which are not authorized (i.e., those which violate some of the constraints).

INCORPORATION BY REFERENCE

The following references, the disclosures of which are incorporated herein in their entireties by reference, are mentioned:

U.S. application Ser. No. 09/986,608, filed Nov. 9, 2001, Pub. No. 2003/0090697, May 15, 2003, entitled "PRINTER THAT REDIRECTS JOBS TO BUDDY PRINTER," by Samuel M. Lester, et al., discloses a network printer which is assigned a buddy printer. When the network printer is in a state in which it is not ready to process new print jobs, any print jobs received by the network printer are redirected to the buddy printer for execution. The current status of the buddy printer is determined by the network printer, whereby print jobs are redirected to the buddy printer only when the buddy printer is currently in a ready state.

U.S. Pat. No. 6,573,910, entitled "INTERACTIVE DISTRIBUTED COMMUNICATION METHOD AND SYSTEM FOR BIDDING ON, SCHEDULING, ROUTING AND EXECUTING A DOCUMENT PROCESSING JOB," by C. B. Duke, et al., discloses a method and system which allow for interactive, distributed job processing, e.g., print job processing, using a network, such as the Internet, and self-aware, remote processing equipment. Self-awareness allows the equipment to provide information about its load and status to a system controller such as a system server, either directly or through location servers located near the remote processing equipment. The method and system provide the capability to perform scheduling, routing and bidding on execution of jobs as well as re-routing, re-scheduling, remote proofing and remote processing instruction modification.

U.S. Pat. No. 6,805,502, entitled "METHOD FOR DETERMINING OPTIMAL BATCH SIZES FOR PROCESSING PRINT JOBS IN A PRINTING ENVIRON- MENT," by S. Rai, et al., describes a method for determining optimal batch sizes for processing print jobs in printshops.

BRIEF DESCRIPTION

The exemplary embodiment relates to a method for redirecting print jobs, to a negotiation apparatus, and to a printing system.

In accordance with one aspect, a method for redirecting a print job includes providing a network comprising a plurality of printers, each printer being associated with a negotiator, the negotiators each being configured for utilizing constraint services which ensure that constraints associated with an outsource request are met. Each of the constraint services applies a different set of constraints. The constraint services comprise a split service which ensures that if the print job is split into sub-jobs, the print job is an exact composition of the sub-jobs, an include service which enables an offer to be made by another negotiator for a portion of the print job, and an equal service which ensures that a print job is outsourced as a whole, conducting at least one negotiation for the redirection of at least a portion of the print job between a first negotiator associated with a first printer of the plurality of printers and at least another negotiator associated with another of the plurality of printers, including utilizing at least one of the constraint services to formulate an outsourcing request for execution of at least a portion of the print job for the first negotiator, the outsource request including parameters of the print job expressed in a negotiation protocol, communicating the outsource request from the first negotiator to the other negotiator, where the print job meets insourcing conditions, communicating a print job insource offer for execution of at least a portion of the print job to the first negotiator from the other negotiator, expressed in the negotiation protocol, whereby an agreement is formed between the first negotiator and the other negotiator, and optionally, where the communicated insource offer is for only a portion of the print job, formulating a modified outsourcing request which takes into account the insource offer for the portion of the print job. The print job is redirected to at least one other printer of the plurality of printers with which an agreement has been made through negotiation between its negotiator and the first negotiator.

In another aspect, a negotiation apparatus includes a negotiator associated with a printer. The negotiator communicates with other negotiators, each associated with a respective printer. Each of the printers is capable of executing print jobs. The negotiator includes memory for storing information on a plurality of ongoing negotiations, each of the ongoing negotiations comprising an outsource request and at least one insource offer from another of the negotiators, which is at least partially responsive to the outsource request. A processor, in communication with the memory, which executes processing instructions for carrying out a negotiation in which the negotiator seeks to outsource a print job. The processor in executing the processing instructions, generates an outsource request for a print job to be outsourced, expressed in the negotiation protocol, the outsource request includes parameters of the print job, communicating the outsource request to at least one other of the negotiators, receiving an insource offer from another negotiator, expressed in the negotiation protocol, the insource offer being at least partially responsive to an outsource request, and identifying at least one insource offer which satisfies the outsource request.

In another aspect, a printing system includes a plurality of printers which execute print jobs, the printers being capable of redirecting print jobs to other printers of the plurality of printers. A negotiator is associated with each of the printers which is capable of negotiating a redirection of a print job from its associated printer to another of the printers. When a first of the printers receives a print job with parameters which the first printer cannot execute, its negotiator seeks to outsource the print job, by communicating an outsource request which includes parameters of the print job to at least a second of the negotiators of the other printers, the parameters of the print job being expressed in a negotiation protocol, the at least a second negotiator which receives the outsource request applying an insource mechanism which determines whether to make an offer in which the associated printer is to execute at least a portion of the print job to be outsourced and where the second negotiator determines to make the offer, the second negotiator communicating an insource offer for the at least a portion of the print job to the first negotiator, expressed in the negotiation protocol, the negotiators each being configured for entering a plurality of negotiations for a particular print job to be outsourced and for entering a plurality of negotiations for different print jobs to be insourced.

In another aspect, an article of manufacture to be communicatively linked with a printer is provided. The article includes a negotiation processor comprising processing instructions for performing a negotiation with negotiation processors associated with other printers. The processing instructions include instructions for outsourcing print jobs, including instructions for generating an outsource request for a print job to be outsourced, the outsource request including parameters of the print job, instructions for communicating the outsource request to other negotiation processors, instructions for forming an agreement with a second processor which communicates an insourcing request which is at least partially responsive to the outsource request, instructions for generating a modified outsource request when the second negotiation processor which communicates an insource offer communicates an insource offer which is only partially responsive to an outsource request, and instructions for redirecting the print job to at least one other printer, for which an agreement has been formed with the associated negotiation processor. The instructions may further include instructions for insourcing print jobs including, instructions for generating an insource offer for a print job to be insourced, the insource offer being at least partially responsive to an outsource request from another processor, and instructions for communicating the insource offer to the processor communicating the outsource request.

DETAILED DESCRIPTION

Figure 1:
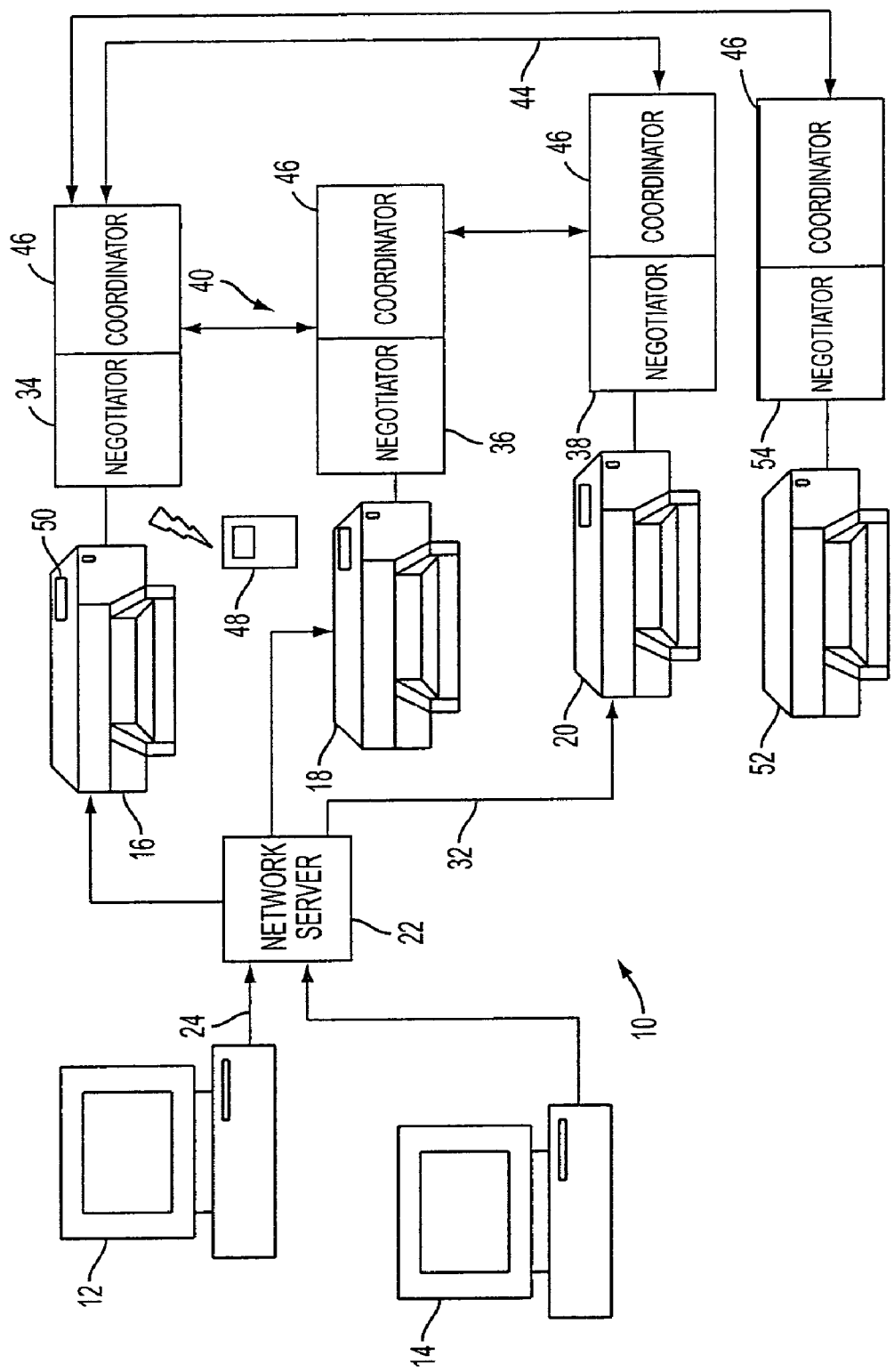
FIG. 1 is a block diagram of a printing network in accordance with the exemplary embodiment.

Aspects of the exemplary embodiment relate to a negotiation apparatus and to a method of negotiating outsourcing of jobs from resources, such as printers.

In one aspect, the negotiation apparatus includes negotiators for a plurality of associated printers, each of the printers being capable of executing print jobs. Each printer has its own dedicated negotiator, either integrated in the printer or associated therewith. The negotiators communicate with each other using a shared negotiation protocol by which print jobs are outsourced by one of the printers and insourced by one or more of the printers. When a first of the printers is unable to execute a print job in accordance with parameters associated with the print job, the first printer's negotiator may seek to outsource the print job by communicating an outsource request which includes at least some of the parameters of the print job, to one or more of the negotiators of the other printers. The negotiator may initiate an outsourcing request autonomously or in response to a user's request to do so. The parameters of the print job are expressed in the negotiation protocol. A negotiator of another printer which receives the outsource request may enter a negotiation by communicating an insource offer for all or a part of the print job, expressed in the negotiation protocol. The offering negotiator includes a mechanism which determines whether to make an offer. The negotiators may each be configured for entering into a plurality of negotiations with other negotiators for a particular print job that the negotiator wishes to outsource and for entering into a plurality of negotiations for different print jobs which a negotiator is willing to insource.

Another aspect of the exemplary embodiment relates to a method for redirecting print jobs in a network comprising a plurality of printers, each of the printers being associated with its own negotiator. The method may include communicating an outsource request for execution of a print job from a first negotiator associated with a first of the printers (the outsourcing printer) to one or more second negotiators, each associated with another printer (the insourcing printers). The outsource request includes parameters of the print job, which may be expressed in a negotiation protocol which is common to all the negotiators. A print job insource offer for execution of at least a part of the print job may then be communicated to the first negotiator from at least one of the negotiators of the insourcing printers (insourcing negotiators), expressed in the negotiation protocol. The insourcing negotiator makes a determination of whether to make an offer to insource the job based on insourcing conditions, which may be derived from one or more of: the parameters of the job, capabilities of the associated printer, a status of the associated printer's print job queue, a status of one or more other ongoing negotiations it is involved in, and local usage policies, such as preset limits on the size of jobs which may be insourced. Information on a negotiation comprising the communicated outsource request and communicated insource offer for a print job is stored in memory accessible to the outsourcing printer's negotiator. An agreement is formed between the two negotiators which includes the insource offer. Several agreements may be formed for all or part of the print job and the method may include the outsourcing negotiator selecting one or more agreements from among the agreements. Agreements may be revoked by the insourcing negotiator at any time prior to a commitment stage. The insourcing negotiator may tentatively allocate one or more time slots to a print job under negotiation and may tentatively allocate the same time slot to two or more print jobs which are the subject of ongoing negotiations. When an agreement is confirmed by the outsourcing negotiator and the allocation for the print job which is the subject of the agreement is confirmed, the outsourcing printer and the insourcing printer(s) are thereby committed to the redirection, and all other agreements based on tentative allocations of that time slot are revoked. The print job is redirected from the outsourcing printer to at least one of the insourcing printers associated with a negotiator with which an agreement has been made.

It will be appreciated that at various times, a printer may serve as an outsourcing printer or an insourcing printer, or as both an outsourcing printer and an insourcing printer for different print jobs. Where agreements are made with more than one negotiator, a user may be provided with a plurality of print job execution solutions, each of the solutions corresponding to at least one of the plurality of agreements stored in the memory. When more than one agreement has been made, or when two or more negotiators make insource offers for only a portion of the print job, the outsource request may be refined by adding constraints to the request and the refined request communicated to those negotiators with which an agreement has been made.

The negotiator for the outsourcing printer may make a first outsource request which requests that one printer executes the entire job. If no responses to the first outsource request for a print job are received in a predetermined time period, which may depend on constraints derived, for example, from the deadline for execution of the print job, the outsource request may be modified to permit splitting the job, and the modified outsource request communicated to the negotiators of the insourcing printers.

The parameters of the print job may include one or more of: a location of the printer which executes at least a portion of the print job, a deadline for completion of the print job, a total number of pages in the print job, and a maximum cost per page.

Where a print job is split into sub-jobs to be executed by different printers, the outsource request may further include one or more constraints, such as a total job size equals the sum of a size of each sub-job, a total job costs equals the sum of a cost of each sub-job, a deadline for completion of a sub-job does not exceed a deadline for completion of the job, a minimum size of a sub-job, and the like.

The negotiators or other processing components may each offer a plurality of defined services which ensure that constraints associated with an outsource request are met, each of the services applying a different set of constraints. These services may be invited singly or in combination by a negotiator of an outsourcing or insourcing printer. Services may include one or more of a SPLIT service which ensures that a job is an exact composition of two sub-jobs, an INCLUDE service which ensures that inclusion dependencies between a sub-job and the print job are respected, an EQUAL service which ensures that equivalence dependencies between two jobs (e.g., an outsourced job and a corresponding insourced job) are respected, an OUTSOURCE service, which seeks to outsource a job, and an INSOURCE, which seeks to insource a job.

Each negotiator may store ongoing negotiations with one or more negotiators in memory. A negotiator for an insourcing printer may store information on the ongoing negotiations in which the negotiator has made insource offers for different print jobs in its associated memory. The negotiators are thus configured for contemporaneously conducting a plurality of ongoing negotiations for a particular print job to be outsourced and for contemporaneously conducting a plurality of ongoing negotiations for different print jobs to be insourced. When a negotiator determines that the number of print jobs for which negotiations are ongoing for the associated printer to insource jobs exceeds a preset maximum, participating in further negotiations may be halted until the number of ongoing insourcing negotiations falls below the preset maximum.

Redirection of a print job may encompass redirecting a print job from memory located in the printer or from a memory located elsewhere, such as in a network server or a workstation.

A "print job" or "document" is normally a set of related sheets, usually one or more collated copy sets copied from a set of original print job sheets or electronic document page images, from a particular user, or otherwise related. An image generally may include information in electronic form which is to be rendered on the print media by the marking engine and may include text, graphics, pictures, and the like. The operation of applying images to print media, for example, graphics, text, photographs, etc., is generally referred to herein as printing or marking.

A negotiation may be defined as a transaction involving a plurality of distributed resources, the goal of which is to have the distributed resources: (i) agree on a set of actions to be executed by each of them (i.e., reach a consensus on negotiated issues); and (ii) execute the set of actions in an autonomous way.

When a network system is functioning optimally, printing can be as simple as clicking on the "Print" button inside an application. However, problem can arise, if for example, the destination printer chosen or designated by the user is busy or faulty, or if the user does not know how to choose a destination printer but still has constraints on a print job. Typical constraints include time deadlines, accessibility to the document produced, and the like. The exemplary embodiment provides a method for dealing with such situations, without putting the burden entirely on the user. The exemplary system allows flexible printing, in which the print devices are interconnected, have some autonomy in the management of their own workload and can negotiate among themselves the execution of a print job. The negotiation may be under the control of the job requester (a user requesting the print job) or entirely autonomous.

Specific mechanisms which allow the printers to participate in such negotiations involve mechanisms for communication between printers and, in some embodiments, to enable participation from the user. In various aspects, methods are provided for allowing printers in a printing network act as decision-makers during re-direction processes, where they negotiate on if and how to outsource/insource print jobs to/from other printers, taking into account their own current status as well as users' preferences and decisions.

FIG. 1 illustrates an exemplary network 10 comprising one or more job sources, such as work stations 12, 14, e.g., PCs, laptops, or other computer devices, which are linked to a plurality of printers 16, 18, 20. The print job sources 12, 14 may be linked directly to one or more of the printers or linked via a network server 22 or internet connection. In the illustrated embodiment, each of the personal computers 12, 14 is linked to the network server 22 via a wired or wireless connection 24, 26, which, in turn is linked to each of the printers by a wired or wireless connection 28, 30, 32, respectively. Other configurations are readily envisaged. The work stations 12, 14 send print jobs to the printers to be printed.

The exemplary printers 16, 18, 20 may include components for marking print media, such as paper or other flexible sheet material, with a marking media, such as toners or inks, and may be embodied as a copier, printer, bookmaking machine, facsimile machine, or a multifunction machine. Each of the printers 16, 18, and 20, serves as a print job outsourcer and a print job insourcer. Specifically, each printer includes or is otherwise associated with an autonomous negotiator 34, 36, 38, respectively, which is configured for outsourcing and insourcing print jobs through negotiations with the respective negotiator(s) of other printers. The negotiators 34, 36, 38 for a plurality of printers are linked to each other directly, via wired or wireless links 40, 44, such as an intranet or internet connection, and/or through an intermediate device, such as a coordinator 46. Although a separate coordinator is shown as being incorporated into each negotiator (or otherwise associated with it), it is also contemplated that a coordinator may be separate from the negotiators and that two or more negotiators may communicate via the same coordinator which may be located in one of the negotiators or spaced therefrom.

A job requester (e.g., a user of the network) may participate in the negotiation, for example, via the source workstation 12, 14 or by other device adapted for communication with the negotiator, such as a personal digital assistant (PDA) 48 or through a keyboard entry pad 50 at the printer 16, 18, 20. It will be appreciated that not all negotiators need be linked with every other. For example, as illustrated in FIG. 1, a printer 52, which may be linked to another network and/or workstation (not shown) has an associated negotiator 54 which is linked with one or more of the other negotiators 34, 36, 38.

While the exemplary system is illustrated with two job sources 12, 14 and four printers 16, 18, 20, 52 it is to be appreciated that there may be fewer or more job sources and fewer or more printers, such as two, three, five, or six printers, each with an associated negotiator. In general, a network includes at least two printers and associated negotiators which are communicatively linked.

The negotiators 34, 36, 38, 54 and coordinator(s) 46 can comprise autonomous software programs that may operate on one or more computational machines that are communicatively coupled using networks such as the Internet or an intranet and which include negotiation processing instructions for performing a negotiation. Each computation machine may involve one or more processing systems including, but not limited to, a CPU, memory/storage devices, communication links, communication/transmitting devices, servers, I/O devices, or any subcomponents or individual parts of one or more processing systems, including software, firmware, hardware, or a combination thereof. The negotiators may operate in a negotiation framework similar to that described in U.S. application Ser. Nos. 10/065,491 and 10/065,492, which are incorporated herein in their entireties by reference. The negotiation framework described therein relies on two features to constrain a negotiation: (i) an incremental feature (i.e., convergence towards a consensus is obtained by incremental steps by each participant), and (ii) a non-deterministic feature (i.e., participants may explore alternatives at decision points). The negotiation is modeled as a collaborative process among autonomous decision-making components, possibly distributed and with different goals and resources, towards the definition of an agreement as to a set of actions to be executed by each of them. Once an agreement is reached, the corresponding actions become part of transactions that are executed by the components.

Typically, when a user on a personal computer 12, 14 connected to the network 10 has a print job to be printed, the user selects a local network printer 16, 18, 20 to perform the print job. Alternatively, a network printer may have been previously selected to perform the print job (and all other print jobs) output by the user. For example, printer 16 may be the default printer for work station 12. The assigned network printer 16 is typically located close to the user's computer 12, so that the user does not have to walk far from the work station in order to retrieve the print job after it has been completed.

Figure 2:
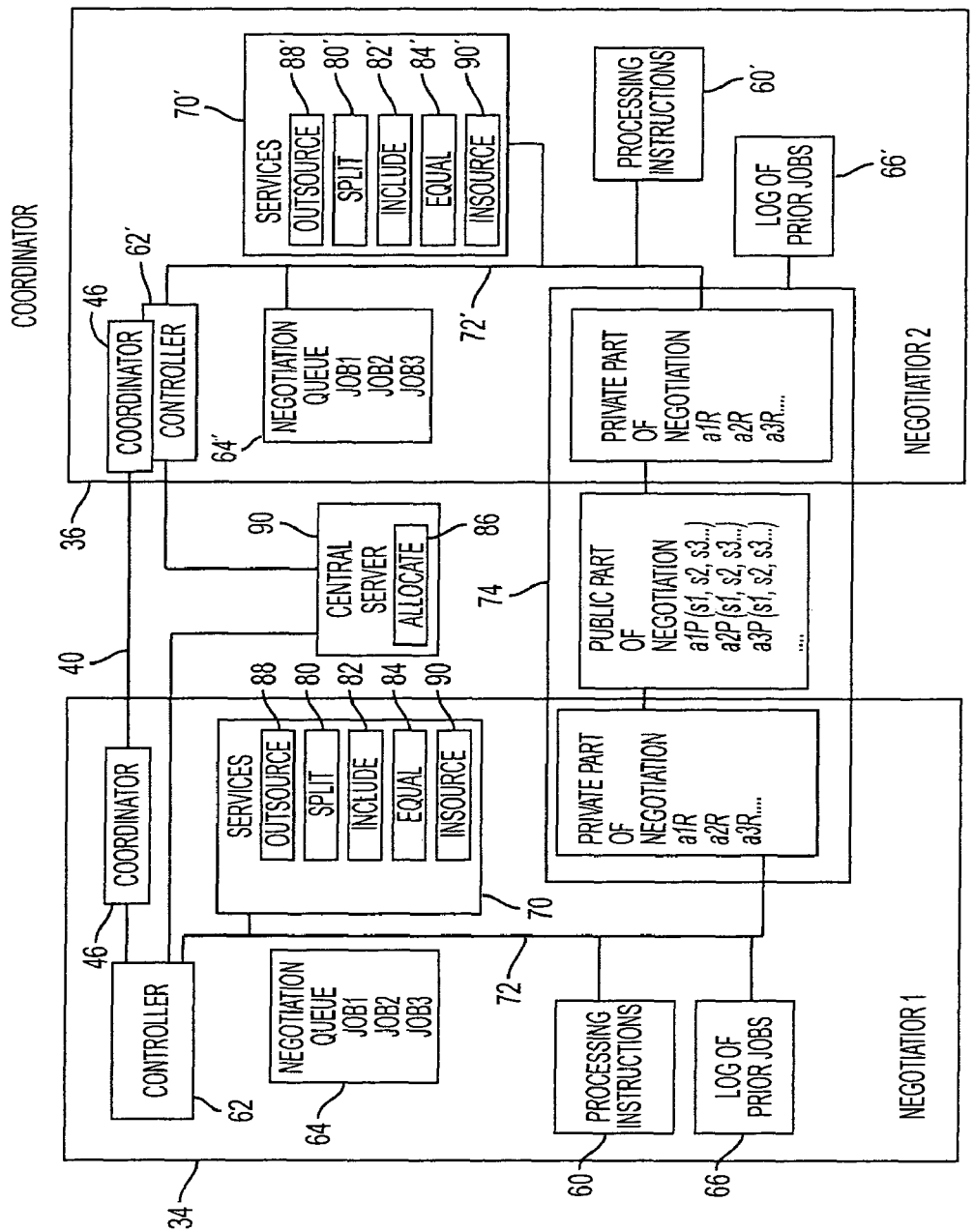
FIG. 2 is a block diagram of functional components of a negotiation apparatus for the printing network of FIG. 1.

FIG. 2 illustrates two of the negotiators, 34, 36, by way of example, engaged in a negotiation. Components of negotiator 36 are given the same element numbers as the analogous components of negotiator 34, distinguished by a prime ('). As illustrated in FIG. 2, each negotiator 34, 36, 38, 54 may include two decision-making mechanisms that model how the printer can make decisions on if and how to outsource/insource print jobs (or simply "jobs") to/from other printers. In particular, the negotiators each include an insourcing decision-making mechanism and an outsourcing decision mechanism. The mechanisms may be embodied in processing instructions 60 stored in memory, which are executed by a controller 62. In the case of the insourcing decision mechanism, the negotiator generates and updates an insource negotiation queue 64, which allows a printer to keep track of which and how many negotiations it is involved in for insourcing jobs. The negotiation queue may be stored in memory. Such a queue 64 may be parameterized by a threshold of acceptance (of new negotiations), which can be learnt by exploiting a log 66 of previous negotiations stored in memory. The outsourcing decision-making mechanism serves as a coordinator of a number of negotiation services 70. Memory and processing components of the negotiator may be connected by a bus 72. The processing instructions may be provided on an article of manufacture, such as a disk or other computer readable medium, which is installed in the workstation, printer or other network component.

Negotiation Architecture

The two mechanisms described above allow a printer to semi-autonomously make decisions during a job redirection negotiation process. One mechanism, addresses the case of a printer that wishes to outsource a job (or parts of it) to another (or other) printer(s). The other mechanism addresses the parallel case of a printer that wishes to insource a job (or part of it) from another printer.

The negotiations are unrolled by the autonomous negotiators 34, 36, 38, 54, which can be of any kind, e.g., embedded in print devices or sitting in servers and which may be controlled by a user through a graphical user interface (GUI). The negotiator offers an interface made up of services 70. The services are in the form of processing instructions, which may be stored in memory. Each service executes a different set of processing instructions tailored to the service to be provided. Each service may be, for convenience, characterized by an individual name and a list of formal operating parameters, and encapsulates a negotiation strategy in order to reach a certain goal. Thus, a negotiator 34, 36, 38, 54 can negotiate with another negotiator by inviting one of its services 70. The result of an invitation is the creation of a virtual space 74 where both the inviter and the invitee can exchange messages to unroll the negotiation. Any convenient protocols may be used in this exchange. For example, in a bi-party negotiation (initiated by an invitation):

1. Each party stores a state of the negotiation in the form of an evolving set of alternatives $a_1, a_2, a_3 \ldots$. Each alternative has a public part $(a_{1P}, a_{2P}, a_{3P} \ldots)$ and a private part $(a_{1R}, a_{2R}, a_{3R} \ldots)$. The public parts of the two parties are synchronized by the negotiation protocol.
2. An agreement consists of the consensus on one of the alternatives (but there may be consensus in several alternatives, hence several agreements). Some alternatives can be explicitly renounced by one or the two parties, in which case it cannot result in an agreement, but otherwise, all the other alternatives can be non-deterministically pursued.
3. The public part of an alternative consists of a set of statements $s_1, s_2, s_3$, etc. about the parameters of the service under negotiation. Each statement consists of an aspect of the parameter and a term that constrains it (meaning that in any agreement in that alternative, the constraint must be respected). It is assumed that both parties have an a priori understanding of the meaning of the parameters and aspects (as negotiation issues). Typically, the parameter can be an item being negotiated (e.g., a job or a car), and an aspect one of its negotiable characteristics (e.g., number of pages to be printed in the case of a print job or color in the case of a car).
4. New alternatives can be created at choice points introducing alternative refinements of previous alternatives. A refinement may concern one or multiple previous alternatives. In one case, called merging, the alternatives being simultaneously refined must of course not originate from the same choice point: for example, a car may be red or blue, and may be expensive or cheap. One can merge and refine the cheap-red case, obviously not the blue-red one, which does not make sense. Refinement does not a priori disqualify the alternatives which are refined: they are still open for other, concurrent refinements.

Multi-party negotiations can easily be achieved by combining multiple bi-party negotiations via one or more coordinators 46, which are universal negotiators, simply applying a copycat strategy on each of the parameters shared by the negotiations they coordinate. Above-mentioned Published Application Nos. 2004/0083186 and 2004/0083187 describe such coordinators and a negotiation infrastructure which may be incorporated herein.

Services, Parameters, Aspects for the Printing Process

Examples of services 70 which may be provided by or for the negotiators are shown in TABLE 1. In the case of printers, the parameters are jobs. The job to be outsourced is the job. A job may be split into two or more sub-jobs, job1, job2, etc.

TABLE 1

Services Offered by a Printer, and their Parameters

| Name of Service | Parameters | Function |
|---|---|---|
| OUTSOURCE | Job | seeks to outsource a job (job) |
| SPLIT | job, job1, job2 | ensures that "composition" dependencies between a job (job) and its two sub-jobs (job1 and job2) are respected. |
| INCLUDE | job, job1 | ensures that "inclusion" dependencies between a job (job) and a part of it (job1) are respected. |
| EQUAL | job, job1 | ensures that "equivalence" dependencies between two jobs (job and job1) are respected. |
| ALLOCATE | Job | ensures that a job (job) is performed by a device which is a priori adequate to perform it. |
| INSOURCE | Job | seeks to insource a job (job). |

Exemplary aspects of a job are described in TABLE 2. The notation parameter.aspect is used for indicating a given aspect of a parameter, e.g. job.size denotes the aspect size of the parameter job. It will be appreciated that these aspects are exemplary and that fewer or more aspects may be defined.

TABLE 2

Aspects of a Print Job Parameter

| ASPECT NAME | DESCRIPTION |
| --- | --- |
| Id | identifier of the job |
| Size, duplex, color | size of the job, duplex, and color options |
| Deadline | deadline for the execution of the job |
| Cost | cost for performing the job |
| Loc_Source | where the requester of the job comes from (physical location) |
| Loc_Sink | where the requester of the job needs the produced document |
| Performer | identification of the print device responsible for the job |

The services may be defined as follows:

The SPLIT(job, job1, job2) service 80 can be invited by a negotiator who wants to ensure that the set of dependencies defining a job (job) as the exact composition of two sub-jobs (job1 and job2) are respected. Exemplary declarative statements defining the negotiation strategy for this service is by means of constraints such as:

job.size=job1.size+job2.size
job.cost=job1.cost+job2.cost
job1.deadline<=job.deadline
job2.deadline<=job.deadline
job.loc_source=job1.loc_source
job1.loc_sink=job2.loc_source
job2.loc_sink=job.loc_sink The constraint on the size aspect expresses that the size of job must be equal to the sum of the sizes of the two sub-jobs job1 and job2. So, for example, if negotiation statements have been established in an alternative, which require that the size of job must be equal to 100 (e.g., copies or pages) and the size of job1 must be at most 60, then the strategy of the SPLIT service could consist of inferring that the size of job2 is in the range 40-100 and turn that into a new negotiation statement. The constraint on the cost aspect is analogous. The constraints on the deadline aspect model the fact that the deadline for performing the whole job must exceed the deadlines for performing both sub-jobs. The last three constraints concern the location(s) of the printer(s) performing the job(s): they assume that to collect the whole job, the requester will first collect the first sub-job, and from there collect the second sub-job. A similar service has been defined in application Ser. No. 10/855,515, incorporated herein by reference.

The INCLUDE(job, job1) service 82 can be invited by a negotiator to ensure that a job (job1), such as a sub-job insourced by another printer, is part of another job (job), such as the print job in question. The negotiation strategy for this service can be defined by constraints such as:

job1.size<=job.size
job1.deadline<=job.deadline
job1.cost<=job.cost
job.loc_source=job1.loc_source The INCLUDE service 82 thus ensures that these constraints, which create inclusion dependencies between an insourced sub-job (which can be up to and including the size of the print job) and the print job to be outsourced are respected. The include service generally guarantees that a sub-job is included in a job and it is used for being able to consider offers on the job or on a sub-part of it before deciding if the job has to be split. When the split option is explored offers on the sub-part are taken into account.

The EQUAL(job, job1) service 84 can be invited by a negotiator to ensure that a job (job1) is equivalent to another job (job). Again, the negotiation strategy can be defined by constraints such as:

job1.size=job.size
job1.cost=job.cost
job1.deadline=job.deadline
job.loc_source=job1.loc_source
job.loc_sink=job1.loc_sink This service ensures that an entire print job is executed by the same printer.

The ALLOCATE(job) service 86 can be invited by a negotiator to ensure that a job (job) is performed by a printer which is a priori adequate to perform it. The strategy of such a service could consist of consulting a listing of characteristics (e.g., yellow-page-like descriptions) of the available printers on the network and matching them with what is known of the job at hand through the negotiation statements, e.g., the location where the requester of the job needs the produced document (job.loc_sink). If, in an alternative, the performer of the job is already specified (e.g., through a statement of the form job.performer= . . . ), then the ALLOCATE service simply verifies that the description of this performer matches what is known otherwise about the job. If, on the other hand, the performer is not specified, then the strategy of the ALLOCATE service could be to compute the "best" matches, then build one alternative for each match, and in that alternative, assert a negotiation statement fixing the performer aspect. The determination of the best match may have to wait till sufficient information is received about the job. There are many other possibilities for the definition of the strategy for this service, which need not be detailed here.

The OUTSOURCE(job) service 88 can be invited by a negotiator who wants the printer to outsource one of its jobs (job), and negotiate the conditions of this operation.

The INSOURCE(job) service 90 can be invited by a negotiator who wants the printer to insource a given job (job), and negotiate the conditions of this operation. The insource service includes processing instructions, which when invited to insource a job, cause an offer to insource the job to be made if the associated printer is capable of executing the print job or a portion thereof which meets the parameters of the outsource request.

The ALLOCATE service 86 could reside on a central server 90 holding a unique yellow-page directory and available to all the negotiating agents, or be replicated and customized within each printer, so that each printer could have its own representation of its peers, influenced by its own experience. Where each printer has its own ALLOCATE service, the ALLOCATE services of each of the printers can be synchronized with the others.

The constraint based services INCLUDE, EQUAL, and SPLIT have a uniform strategy which is independent of any printer, and could be delivered by a central server 76. However, in order to distribute the computational load, they may be replicated on each printer, as illustrated in FIG. 2. The strategies of the INSOURCE and OUTSOURCE services, on the other hand, use data which is specific to each printer, as described below. Hence, each printer offers these services based on its own data.

Figure 3:
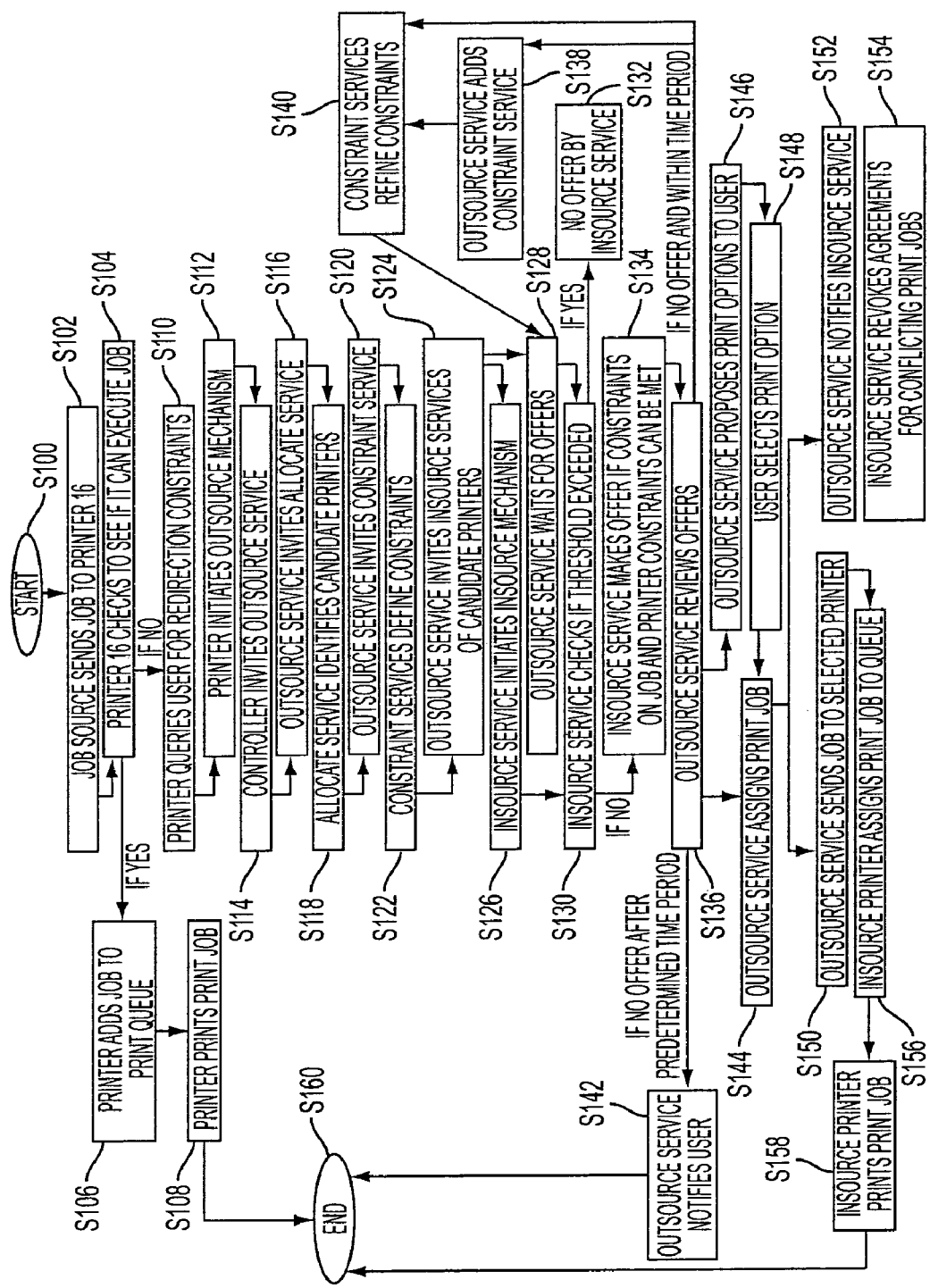
FIG. 3 is a flow diagram of an exemplary method for negotiating the outsourcing of a job for the printing network of FIG. 1.

An exemplary method for redirection of a print job is illustrated in FIG. 3. It will be appreciated that the steps need not be performed in the order illustrated and that fewer or more steps may be employed. The method begins at step S100. At step S102 a print job arrives at one of the network printers, e.g., printer 16. At step S104, the printer 16 determines whether the print job can be performed. This step may include checking the printer's print job queue and determining whether the new print job can be added to the queue without violating any of the print job parameters, such as its deadline for completion, or any of the parameters associated with the other print jobs in the queue. If the printer 16 determines that it can print the print job, the print job is assigned a time slot in the print job queue (step S106) and the print job is ultimately printed at step S108. If the printer is unable to execute the print job, the printer 16 (hereinafter the outsourcing printer) may query the user to determine whether there are any additional parameters which should be assigned to an outsource request, such as a deadline for the print job, a location of the printer which executes the job, and the like (step S118). This step may involve communicating with the user via the user's PDA 48 or the keypad 50, and/or checking the user's calendar stored in the PDA. The printer then seeks to outsource the print job (step S112).

At step S114, the outsourcing controller 62 invites the OUTSOURCE service 88. At step S116, the outsourcing controller invites the ALLOCATE service 86 to identify candidate printers which are nominally capable of performing the job. At step S118, the ALLOCATE service 86 identified candidate printers. At step S120, the OUTSOURCE service 88 invites constraint services, such as the INCLUDE service 82 to define constraints for an initial outsource request, based on the parameters of the job, and the EQUAL constraint service 84, for identifying offers for the whole job. At step S122, the INCLUDE constraint service defines an initial set of constraints which form an initial outsource request, allowing offers for the whole job or a sub-part of it. The OUTSOURCE service 88 invites INSOURCE services 90' of some or all of the candidate printers, such as printers 18, 20, and 52 (hereinafter the insource printers) to negotiate. This step may involve communicating the initial outsource request to the INSOURCE service 90'. At step S126, the invited INSOURCE services 90' initiate the insource mechanism. At step S128, the OUTSOURCE service 88 starts a clock and waits for a selected time $t_1$ for insource offers. At step S130, the INSOURCE services 90' checks to see if a threshold on the number of negotiations it is permitted to participate in is exceeded. If so, the INSOURCE service makes no offer at that time (step S132) or issues a notification to the OUTSOURCE service 88 that no offer is to be made at that time. If the threshold is not exceeded, the INSOURCE service 90' may enter an insource offer in the negotiation queue and may communicate the offer to the outsourcing negotiator, which is received by the OUTSOURCE service 88 (step S134).

Whether or not the INSOURCE service 90' makes an offer depends on the satisfaction of one or more insourcing conditions, which are described in further detail below. The insource offer is associated with a tentative allocation of a time slot (or more than one time slot) in the print job queue. A tentative allocation does not prevent other print jobs from being tentatively allocated to the same time slot. However, the INSOURCE service may respect a threshold which limits the number of print jobs which may be assigned to the same time slot or which otherwise sets constraints on multiple assignments. At step S134, insource offers may also be communicated from one or more INSOURCE services 90' to the OUTSOURCE service 88. These offers may be for the entire job or for only a part of the job and are the basis for one or more agreements. The INCLUDE service ensures that the offers meet the INCLUDE constraints. At step S136, the OUTSOURCE service reviews the entire and/or partial offers and, if no insource offer for the entire job has been received by the end of time $t_1$ (which is checked by the EQUAL service), the preselected time period, at step S138, the OUTSOURCE service 88 may invite additional services, such as the SPLIT service 80, which (optionally in combination with one or more already invited services), modifies the constraints of the OUTSOURCE request (step S140) and the method returns to step S128 where the clock is set for a second preselected time period $t_2$. The modified request may include a request for a remaining portion of the job if an offer for a first portion of the job has already been received. This request may be sent to the other INSOURCE services or to all INSOURCE services, including the INSOURCE service which sent the offer for the first portion of the job. At step S136, the OUTSOURCE service checks again to see if any offers or combinations of offers match the refined request and if not, the cycle may be repeated. It will be appreciated that multiple requests may be in negotiation at any time. This iterative process may be repeated one or more times as constraints are refined, until the clock reaches the maximum time allowed for negotiations $t_{max}$. At substep S142, if no offer is received within the maximum preset time period, $t_{max}$, the OUTSOURCE service notifies the user that the print job cannot be executed within the parameters set for the job. At step S144, if the OUTSOURCE service has identified one or more agreements comprising a single offer or a combination of offers from a plurality of INSOURCE services 90' which matches an OUTSOURCE request for enabling the entire job to be executed, the OUTSOURCE service 88 selects one of the offers or offer combinations and the OUTSOURCE service 88 and INSOURCE service 90' enter a transactional phase, for establishing the details of the redirection. Once the OUTSOURCE service has communicated the acceptance of an insource offer to the INSOURCE service and the INSOURCE service confirms, the agreement becomes a commitment by both the OUTSOURCE and the INSOURCE service and can no longer be revoked. The OUTSOURCE service assigns the print job to the respective printers.

As an alternative, the OUTSOURCE service may propose print options based on the offer(s) to the user (step S146). At step S148, the user selects one of the offers, e.g., with the keypad entry or PDA and the method proceeds to step S144. At step S150, the OUTSOURCE service redirects the print job to the selected printer or printers for executing the job. The OUTSOURCE service 88 may simultaneously communicate the commitment to the INSOURCE service 90' (step S152), which converts the tentative allocation to a confirmed assignment in the print job queue. Any agreements in which other print jobs have tentative assignments for an overlapping time period are revoked by the INSOURCE service 90' (step S154).

At step S156, the printers which receive the redirected print job or a portion thereof, assign the job to their respective job queues and the print job is subsequently printed by the insourcing printer or printers (step 158) in the normal course of printing. Of course, it is to be appreciated that the insourcing printer may not always complete the print job, for example, because of a mechanical failure or because it is required to print another print job of higher priority. In such circumstances, the insourcing printer may itself become an outsourcing printer. The method ends at step S160. The above method provides a simplified description of the steps in the process, in particular, the operation of the insourcing mechanism. It will be appreciated that offers and requests may be communicated directly between negotiators, as described, or via a coordinator 46, as illustrated in FIG. 1. Further details of the method will become evident from the description below.

To illustrate the operation of the services a scenario will now be described with reference to FIGS. 4-7, which show the services used in the scenario. The scenario relates to an office environment where a limited number of resources, typically printers, are shared among several office workers. Exceptions and conflicts can arise during processes taking place in such environments and accessing those shared resources.

A user ("Mary") is in her office on the 10th floor. She opens a document she wants to annotate during a meeting she is going to attend fairly soon. She clicks "Print". The desktop screen proposes to print the document on printer 16 ("Nile"), her default color multifunction device (MFD). She clicks "OK", leaves her office and walks to the printer. Unfortunately, when she gets there, another user ("John") is making a big copy job, which is occupying printer 16. Mary looks at her PDA 48 (FIG. 1) and realizes that if she waits until John's job is finished, she will not get her job done in time for the meeting. So from her PDA, she requests the MFD 16 to suggest alternative solutions. The PDA 48 wirelessly transmits constraints out of her agenda to the MFD 16, such as the meeting location (a room on the ground floor) and an acceptable time delay for her to collect the document. Then, the MFD 16 initiates a negotiation with its peers, searching for a plan for redirection of the print job.

MFD 16 offers Mary, through her PDA (step S146), two options: (1) she can print on printer 18 ("Thames"), a fast but low quality B&W printer located at the 5th floor and currently idle, or (2) the job can be split into two sub-jobs, one to be performed on printer 20 ("Danube"), located at the 10th floor, and one on a fourth printer 52 ("Mississippi"), which is close to the meeting room on the ground floor. Mary chooses option (2) so that she could review the document summary while she goes down in the lift. The PDA confirms that the job has been split and the two sub-jobs redirected respectively to Danube and to Mississippi. Mary returns the PDA to her pocket and walks to Danube's location. She collects the first part of her document nicely printed and heads off for the lift. Once at the ground floor she walks to Mississippi's location. When she gets there the other half of her document is already waiting for her. She then walks into the meeting room with her complete document.

In the scenario, the OUTSOURCE service is invited by an input of the user (Mary) who specifies only the job.id of the job she wishes the printer to redirect. Alternatively, the printer itself could decide to outsource its pending jobs because it has detected an exception. In both cases, the outsourcing negotiation for a job proper starts when the job.id of the job to outsource has been stated. The proposed strategy can be seen as a refinement of a coordinator's behavior combining and coordinating invitations of the SPLIT, INCLUDE, EQUAL and ALLOCATE services, and ultimately, of course, the INSOURCE services of other printers.

Initialization:

The negotiation is initialized by creating an initial alternative and by stating the technical characteristics of the job parameter, e.g. the size (job.size= . . . ), the color option (job.color= . . . ), etc. This information was given to the printer when it received the job identified by job.id in the first place.

The deadline (job.deadline<= . . . ) can be specified from information directly provided by the user, if available, for example from the user's agenda in the scenario. Otherwise the OUTSOURCE service defines the deadline as a function of the estimation of the time needed for performing the job, the average duration of the negotiation processes and the priority of the job, if specified.

Finally, additional information may also be stated if provided (directly or indirectly) by the job owner: current location of the job owner (job.loc_source= . . . ), which, in the scenario, is the printer itself, where Mary discovers the disruption and preferred location for collecting the printed document (job.loc_sink= . . . ).

A new job descriptor j1 is then created and an invitation is launched for include(job, j1) from the INCLUDE service on the same printer. Thus, job j1 is constrained to be a part of job. The intention here is to allow insourcing negotiations on parts of the job as well as on the whole job.

Then, allocate(j1) is also invited, so as to seek potential printers for insourcing the part j1 of job (which, at this point, may or may not be the whole).

Figure 4:
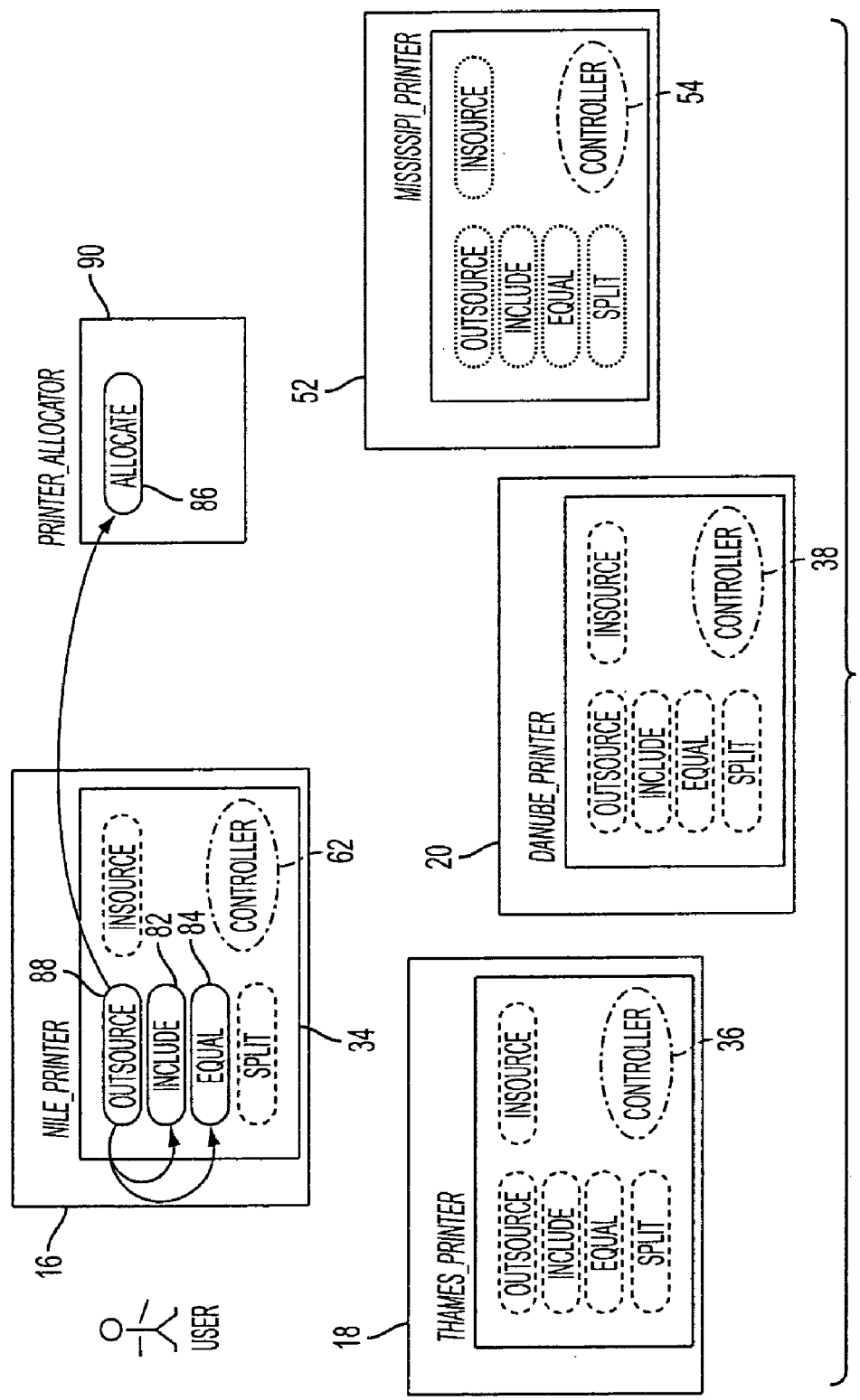
FIG. 4 is a schematic illustration of a launching of a negotiation in the printing network of FIG. 1.

Finally, a choice point is created introducing two alternatives, one where j1 is constrained to be the whole of job and one where it is allowed to be only a strict subpart of it. In the first alternative, equal (job, j1), on the same printer, is immediately invited. The second alternative is not explored until later. FIG. 4 shows this initial phase of the negotiation in our sample scenario where solid lines denote the involved services.

Inviting Candidate Printers for Insourcing

Figure 5:
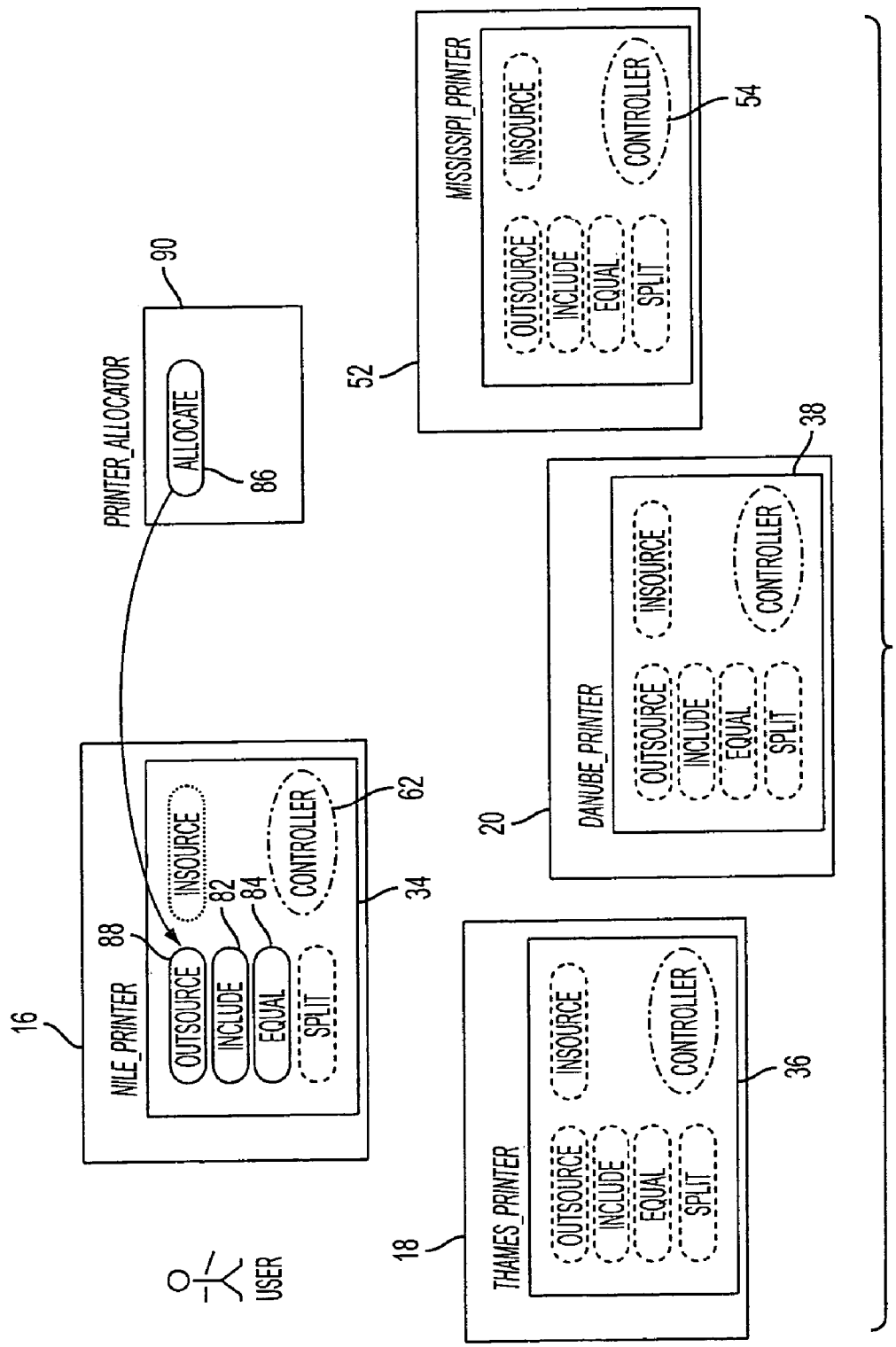
FIG. 5 is a schematic illustration of inviting a candidate printer for insourcing a sub-job following launching of the negotiation.

Whenever an alternative arises where a potential candidate printer for insourcing j1 appears, through a statement j1.performer= . . . by the ALLOCATE service, then INSOURCE(j1), from the INSOURCE service of that candidate, is invited in that alternative (FIG. 5).

It may be assumed that the decisions of the ALLOCATE service 86 on j1 are coarse grain and are based on the information propagated on j1 by include(job, j1). Consequently, the alternatives created by the ALLOCATE service (different performers) are independent of the refined alternative where the constraint "job as a whole" has been stated, even though, in the latter, more information is available about j1 by the work of equal(job, j1).

Reaching Agreements

The alternative where j1 is allowed to be a part of job is explored after a delay, so as to give priority to its refinement where j1 is the whole job. The delay can be specified according to different criteria, e.g., as a percentage of an acceptable delay for the global negotiation, taking into account the deadline, and an estimation of the chances of success of the negotiation in the "job as a whole" alternative.

When the delay has expired, if there are agreements for insource(j1) in alternatives which can be merged with the "job as a whole" alternative, then the best one is chosen. This may be decided either by presenting the candidate agreements to the job owner (Mary in the scenario) who thus have the opportunity to choose, or by computing some utility function and choosing the agreement that maximizes it (e.g., the shortest delay or the nearest location). Also, if an agreement was achieved which did not specify completely all the negotiation aspects, they can be further refined, either by explicit choice of the user or, again, by maximization of the utility function.

Figure 6:
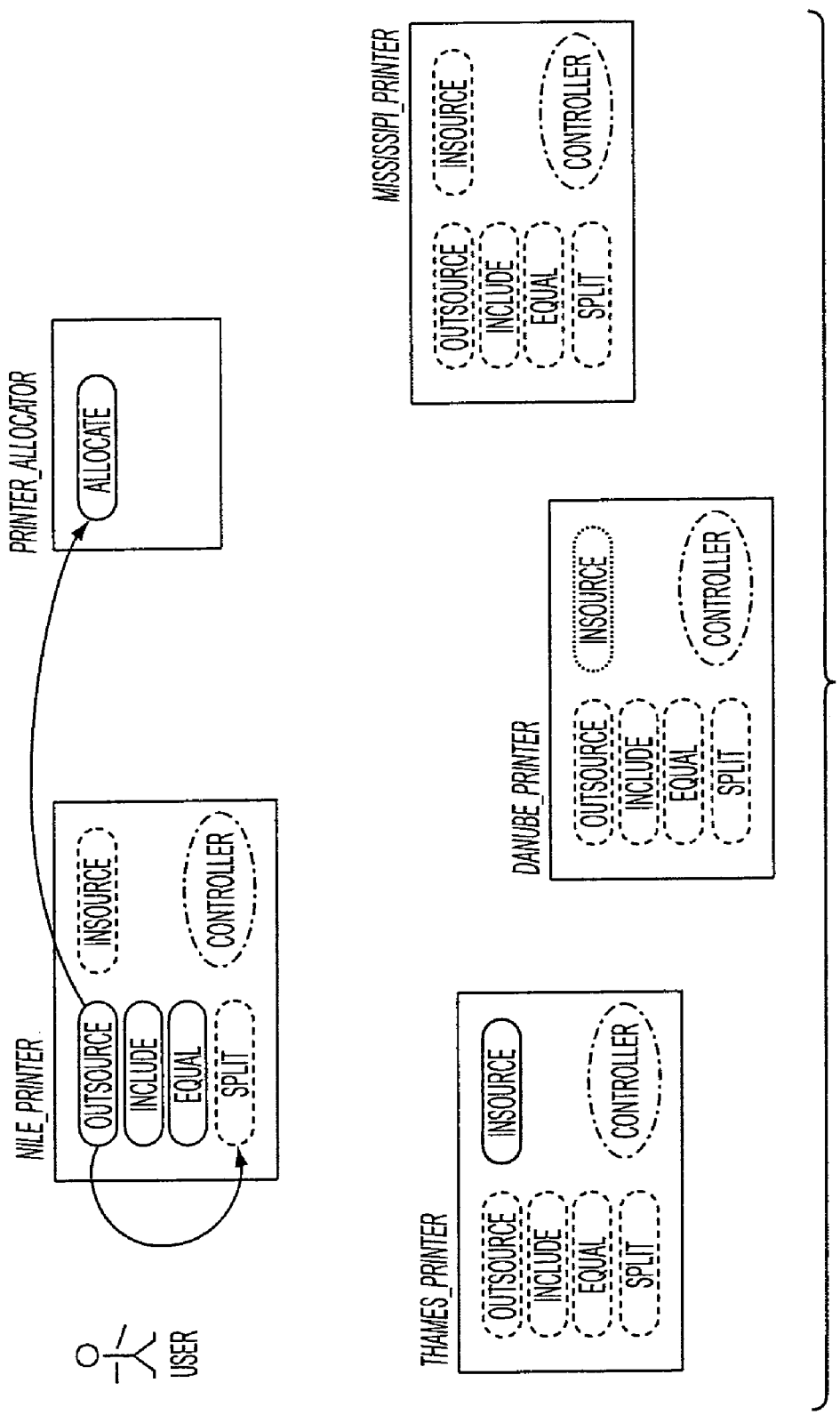
FIG. 6 is a schematic illustration of deploying a splitting strategy in a negotiation of a print job.
Figure 7:
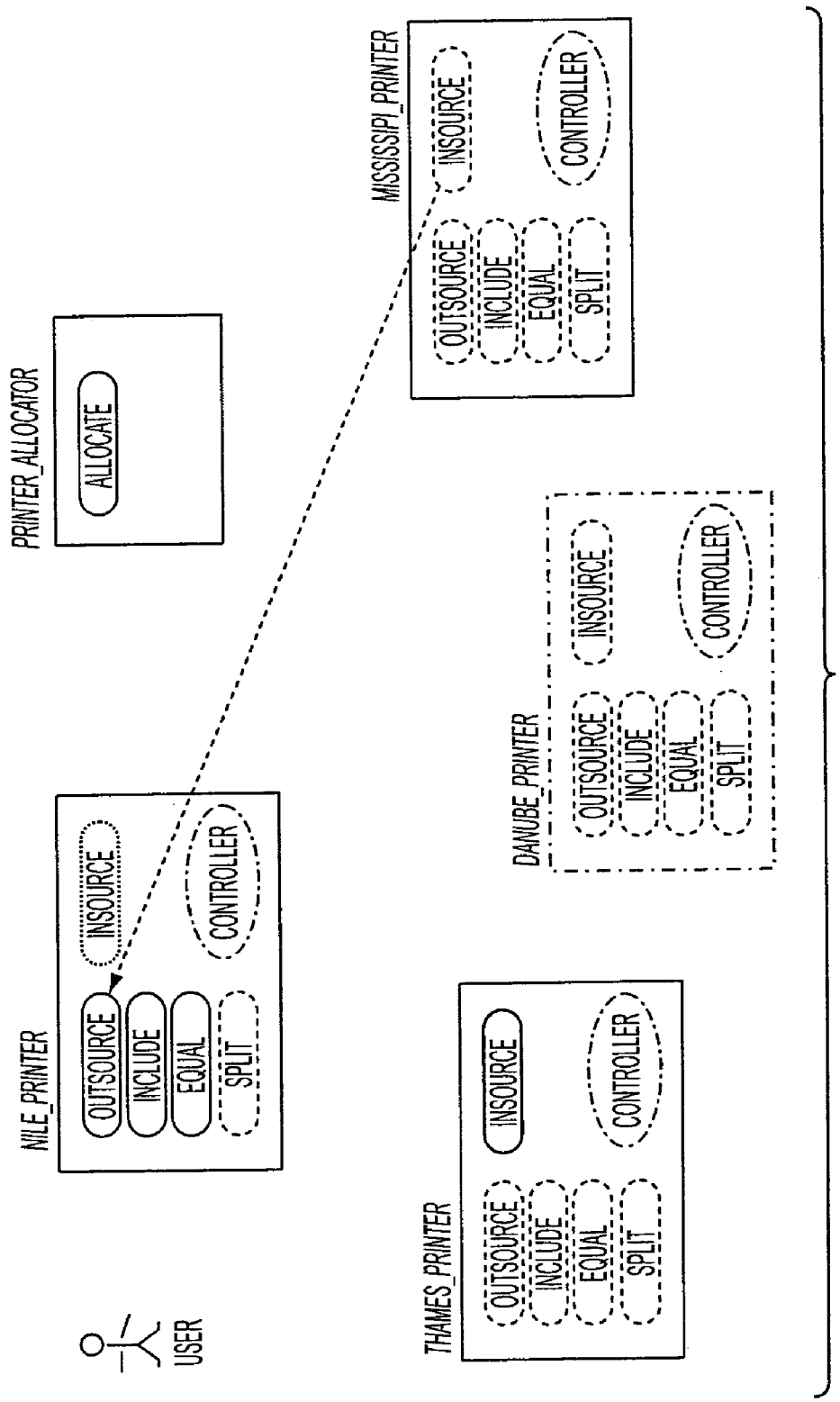
FIG. 7 is a schematic illustration of making an offer during the negotiation.

If no agreement was reached consistent with the "job as a whole" alternative after the delay, the other alternative is explored: a new job descriptor j2 is introduced, and split(job, j1,j2) is invited from the SPLIT service of the printer, as well as allocate(j2) (FIG. 6). This ensures that j2 represents the complement of j1 and is also outsourced.

Reaching More Agreements

Information about j2 may be available in the alternative where split(job,j1,j2) is invited simply because j2 is thus constrained to be a part of job. But even more information may also be available in alternatives merging the "split job"

alternative with alternatives created by the candidates for j1, since, in such merges, information on j1 can propagate to j2.

Whenever an alternative arises where a potential candidate printer for insourcing j2 appears (by the work of the ALLOCATE service 86), then this alternative may be merged with some of the alternatives created by the candidates for j1. Several merging rules could be considered here. One rule could be that two alternatives are merged only if they refer to two different candidate printers. Another rule could specify that the merges will be incrementally done at given intervals of time, respecting a given threshold. Then an INSOURCEe (j2) from the INSOURCE service 90' of that candidate is invited in each of those alternatives.

Whenever an agreement is detected for both insource(j1) and insource(j2), they form a global agreement which becomes a candidate for the whole job.

Closing the Negotiation

At regular intervals of time, the agreements obtained by the procedures outlined above are listed. If the list is not empty, a choice is made by the user, or on the basis of some utility function (as before).

When the deadline for the job (or, if it is unknown, a default period of time) is passed and no agreement was generated or accepted by the job owner, the whole process fails and the job owner is notified that no solution was found. Otherwise, the negotiation enters in a transactional phase for transferring the job or sub-jobs to the selected printer(s) according to the terms of the agreement. If it fails, the negotiation continues with the remaining alternatives, otherwise, the whole negotiation is terminated.

A Negotiation Strategy for the INSOURCE Service

The INSOURCE service 90, 90' has access to information on the print queue of the printer, that is, on the jobs already accepted by the printer. In order to perform a job, a printer needs a number of time-slots which may depend on the complexity and size of the job and the speed of the printer. The time-slots allocated to a job are generally contiguous, although non-contiguous time slots could be allocated where the printer has multiple output trays. Jobs would then be allowed to occupy non-contiguous time-slots, but an extra mechanism (not detailed here) could be employed to ensure that the same output tray is used during all the time-slots allocated to the same job. According to aspects of the exemplary embodiment, a printer may receive requests for insourcing jobs and may be engaged, at any given time, in several insourcing negotiations on different jobs. In order to keep track of which insourcing negotiations the printer is involved in, the INSOURCE service maintains a negotiation queue 64'.

Negotiation Queues

Figure 8:
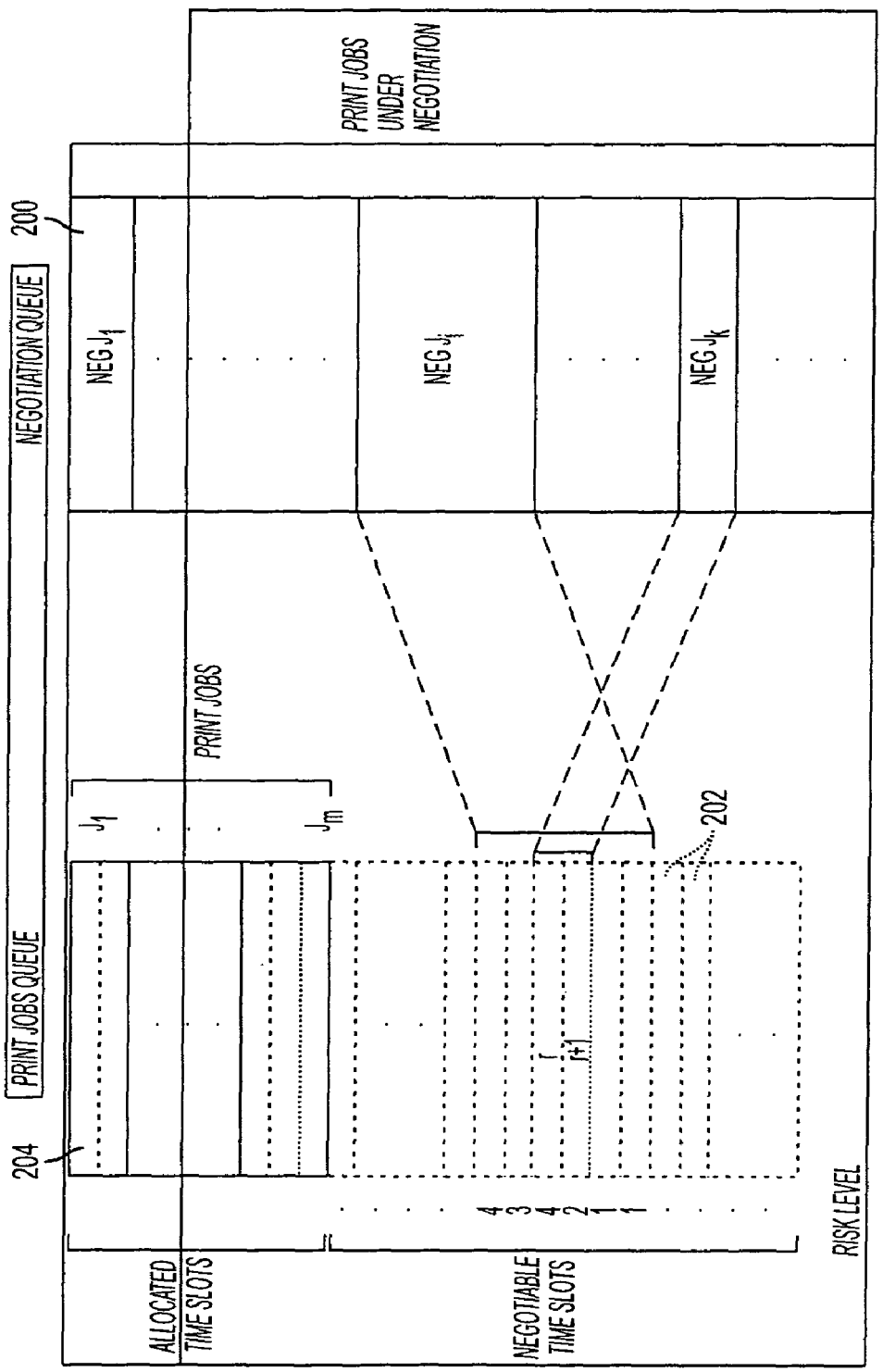
FIG. 8 is an example of a negotiation queue of a printer and links to its print queue.

During an insourcing negotiation, the printer tries to pre-allocate time-slots to the job under negotiation in order to understand if it can perform (parts of) it. When an agreement is reached, a pre-allocation is turned into a definite allocation. A negotiation queue indicates which time-slots of the print queue are pre-allocated (but not yet committed) to each job the printer is negotiating. FIG. 8 shows an example of a negotiation queue 200.

Since pre-allocation is done before commitment, i.e., when the negotiation has not reached the agreement stage yet, and may never reach it, overbooking is allowed. In the example, the negotiated job NegJi requires six time-slots 202 while the negotiated job NegJk only needs two time-slots. The time-slots r and r+1 in the print queue 204 are pre-allocated to both jobs, but of course they will eventually be allocated to at most one of them. The INSOURCE service stores the number of negotiated jobs pre-allocated to each time-slot. In the example, four negotiations are competing for the slot r while only two are competing for the slot r+1. In order to minimize the risk of overbooking resulting in conflicts when the negotiation reaches agreement, a risk level is computed for each time-slot. In a rough approximation, it can be the number of competing negotiations for that time-slot, but it can be something more refined, taking into account an evaluation of the rate of arrival of the requests for insourcing and the chances of success of each deriving negotiation depending on its characteristics. A global threshold is set on the risk level of all the time-slots. Also, another global threshold is set on the completion time of the negotiations. These thresholds may be given an a priori value, or they may be learnt by analyzing the failure rate of previous negotiations (where the outcome of past negotiations is logged, at least up to a certain time in the past).

Engaging in Negotiation

As noted above, the INSOURCE service 90' of a candidate printer is invited by the OUTSOURCE service 88. The INSOURCE service 90' is then presented with an alternative which defines the initial context of the job negotiation with information about the job, expressed as statements on its aspects. Then, the INSOURCE service may engage in the negotiation.

Starting the negotiation may proceed as follows. The proposed strategy for insourcing considers that an alternative (outsource offer) created by a request for negotiation is not taken into account until it provides some minimal information about the job (size, complexity, time constraints etc.). This information can be immediately combined one or more insourcing conditions, such as the usage policy of the printer, if any. For example, such a policy could impose a priori lower or upper bounds on the size of the jobs it accepts. These bounds add to the information already provided on the job, possibly resulting in inconsistency and failure of the alternative where it occurs. Once the minimal information is stated in the initial alternative, the INSOURCE service refines it creating a decision point and a new alternative (an insource offer).

The proposed strategy then proceeds in two phases in each negotiation: one phase where no non-deterministic choice is made for the pre-allocation, but as much constraints as possible are gathered and propagated, and one phase where, if possible, a non-deterministic choice is performed maximizing the offer under the gathered constraints.

The INSOURCE service first computes a lower and upper bounds of the number of time-slots required by a job under negotiation, taking into account the information stated in the alternative and local information on the printer. It then tries to contiguously tentatively allocate these time-slots, respecting the threshold on the risk level of the time-slots.

A variant of micro-opportunistic scheduling can be used for this computation, as described, for example, in N. Sadeh, "Micro-Opportunistic Scheduling: The Micro-Boss Factory Scheduler," in *Intelligent Scheduling* (M. Zweben and M. Fox, Eds., Morgan Kaufmann Publishers, San Francisco Calif., 1994). This technique only computes the time slots which must be pre-allocated given the constraints, thus producing more constraints but never making non-deterministic choices. Thus, if a job cannot start before $t_1$ (because that would result in violating the constraints on the time-slots before $t_1$) and cannot end after $t_2$ (for the same reason or because of a deadline constraint), and requires at least d time-slots, then the time-slots between $t_1-d$ and $t_1+d$ are pre-allocated to that job. It will be appreciated that other time-slots around that interval also have to be pre-allocated, but determining them with certainty could require un-manageable non-deterministic choices, so in the exemplary embodiment, they are not pre-allocated. Tentatively pre-allocating time-slots in this way may, in turn, have the effect of precluding some jobs from starting before or ending after them, and hence reiterate the process.

During this phase, additional information obtained from the negotiating partner OUTSOURCE 88 on the size and complexity of the job are turned into additional constraints on time-slots. Conversely, the INSOURCE service 90' may be able to state some constraints if they are necessarily true for this negotiation, for example a lower bound for the job cost or due time.

After some time (e.g., a percentage of the total time allowed for the negotiation), and if no pre-allocation for that job has already been made, the "best" pre-allocation of the job is chosen according to a given criteria. For example, the best pre-allocation could be the one that maximizes the number of time-slots for the job, if it is not fixed (i.e., as much as possible of the job is offered for insource), and minimizes the end-time of the job. This can be achieved by local backtracking until the job is entirely pre-allocated, possibly generating new constraints for the other jobs.

If a pre-allocation is found then an offer is defined accordingly specifying the latest time for the deadline (job.deadline<= . . . ) and the minimal value for the size of the job to be performed (job.size>= . . . ). If, in the meanwhile, additional information is obtained from the negotiating partner on the size and complexity of the job, it is tested for consistency with the proposed pre-allocation. In case of inconsistency, the whole alternative fails (no further backtracking is allowed). On such failures, the corresponding constraints on the time slots are retracted. Otherwise the OUTSOURCE service 88 is notified of the offer (see FIG. 7) refining the information on the aspects in the active alternatives.

If no pre-allocation at all can be found, a new pre-allocation phase is started.

The offers may be refined. For example, the INSOURCE service 90' takes into account refinements made on its offers by the outsourcing services involved in the negotiation. This is achieved by having the INSOURCE service working only on alternatives which are not refined. If some work is started in an unrefined alternative which is then asynchronously refined, the work is duplicated in each refinement and stopped in the unrefined alternative.

In one embodiment, for each job negotiation, the INSOURCE service selects, at any given time, at most one pre-allocation. An alternative policy could be to select multiple pre-allocations for the same job negotiation. Then, it may make alternative offers with different combinations of sizes and deadlines. This latter option may provide an additional degree of flexibility but also more complexity. Then, an adaptive strategy, combining single and multiple pre-allocation tactics depending on the rate of insourcing requests and previous history of interactions with the outsourcers, could also be considered.

When a job in the print queue is cancelled or a negotiation is closed without commitment, the INSOURCE service makes available the involved time slots. Then it checks the status of the ongoing negotiations in order to see if pre-allocations that were not possible for some negotiations are now available or if pre-allocations can be modified to shorten the deadline or augment the size of the job in the offer.

When a new job arrives in the print queue or a negotiation is closed with a commitment, the INSOURCE service updates the negotiation queue given that the time slots concerned by the job or the commitment are not available anymore. Then, it updates the status of the ongoing negotiations using any of those time-slots since pre-allocations using those time-slots are not valid anymore. Then the INSOURCE service retracts the associated constraints on the negotiation queue and performs new pre-allocation steps for these negotiations.

Each time the global threshold of the completion time for a negotiation has elapsed, the INSOURCE service closes the negotiation and decreases the current number of ongoing negotiations for all concerned time-slots.

If the negotiating partner accepts the offer made by the INSOURCE service on a job, the negotiation enters into a transactional phase for receiving the job to be locally performed according to the terms of the agreement.

In some embodiments, the outsourcing printer may only outsource a portion of the print job and perform the rest itself.

Advantages of various aspects of the exemplary embodiment include load balancing of printer resources and the ability to meet user deadlines without expending a large amount of user time. The system may take advantage of automated print job redirection modeling, as described, for example, in above-mentioned U.S. application Ser. No. 11/013,322, incorporated by reference and may incorporate a constraint-based decision making service, as described, for example in above-mentioned Pub. No. 2005/0108036, which could be used for the SPLIT, INCLUDE, and EQUAL services, with appropriate modifications.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method for redirecting a print job comprising:
providing a network comprising a plurality of printers, each printer being independently capable of executing print jobs by printing on print media, each printer being associated with a negotiator operating on one or more computational machines, the negotiators each being configured for utilizing constraint services which ensure that constraints associated with an outsource request are met, each of the constraint services applying a different set of constraints, the constraint services comprising:
  a split service which ensures that if the print job is split into sub-jobs, the print job is an exact composition of the sub-jobs,
  an include service which enables an offer to be made by another negotiator for a portion of the print job prior to the job being split, and
  an equal service which ensures that a print job is outsourced as a whole;
with a computer processor, conducting at least one negotiation for the redirection of the print job between a first negotiator associated with a first printer of the plurality of printers and at least one another negotiator associated with another of the plurality of printers, including:
  utilizing at least one of the constraint services to formulate an outsourcing request for execution of the entire print job for the first negotiator, the outsource request including parameters of the print job expressed in a negotiation protocol;
  communicating the outsourcing request from the first negotiator to the at least one other negotiator;

where the entire print job meets insourcing conditions, communicating a print job insource offer for execution of the entire print job to the first negotiator from the other negotiator, expressed in the negotiation protocol, whereby an agreement is formed between the first negotiator and the other negotiator;

where a portion of the print job which is less than the entire print job meets insourcing conditions, communicating a print job insource offer for execution of the print job portion to the first negotiator from the other negotiator, expressed in the negotiation protocol, in response to the outsourcing request;

where the communicated insource offer is for only a portion of the print job, which is less than the entire print job, with the include service, ensuring that the insource offer meets constraints for being a sub-job of the print job;

where no print job insource offer for execution of the entire print job is communicated to the first negotiator from the at least one other negotiator within a predetermined time period, modifying the outsourcing request to offer a split of the print job and communicating the modified outsourcing request from the first negotiator to at least one other negotiator, which takes into account the insource offer for the portion of the print job which was received in response to the outsourcing request, thereby enabling agreements to be made with the at least one other negotiator for sub-jobs of the job; and redirecting the print job to at least one other printer of the plurality of printers with which an agreement has been made through negotiation between its negotiator and the first negotiator.

2. The method of claim 1, further comprising:
providing a user with a plurality of print job execution solutions, each of the solutions corresponding to at least one of a plurality of agreements.

3. The method of claim 1, wherein the insourcing conditions are derived from one or more of:
the parameters of the job;
capabilities of the associated printer;
a status of the associated printer's print job queue;
a status of one or more other ongoing negotiations; and
local usage policies.

4. The method of claim 1, further comprising:
where more than one insource offer which is responsive to an outsourcing request for the entire print job are received in a predetermined time period, selecting one of the responses by at least one of:
optimizing a utility function; and
querying a user.

5. The method of claim 4, wherein the predetermined time period is a function of a deadline parameter of the print job.

6. The method of claim 4, wherein the modified outsourcing request permits a split of the print job between at least two of the plurality of printers and wherein the modified outsourcing request is communicated to other negotiators.

7. The method of claim 4, further comprising:
merging a first insource offer for a first portion of the print job from a first of the other negotiators with a first negotiation alternative containing a second insource offer for a portion of the print job from a second of the other negotiators; and
merging the first insource with a second negotiation alternative containing a third insource offer for a portion of the print job from a third of the other negotiators.

8. The method of claim 1, wherein at least one of the parameters of the print job is selected from the group consisting of:
a location of the printer which executes at least a portion of the print job;
a deadline for completion of the print job;
a total number of pages in the print job;
a maximum cost per page; and
combinations thereof.

9. The method of claim 1 wherein where a print job is split into sub-jobs, each sub-job being executed by a different printer, the modified outsourcing request further includes constraints selected from the group consisting of:
a total job size equals the sum of a size of each sub-job;
a total job costs equals the sum of a cost of each sub-job;
a deadline for completion of a sub-job does not exceed a deadline for completion of the job;
a minimum size of a sub-job;
locations of the printers which executes the sub-job; and
combinations thereof.

10. The method of claim 1, wherein the include service applies constraints selected from the group consisting of:
a size of an insource job offer is less than or equal to a size of the print job;
a deadline of an insource job offer is prior to or equal to a deadline of the print job;
a cost of an insource job offer is less than or equal to a cost of the print job; and
a printer location of an insource job offer source is the printer location of the job source.

11. The method of claim 1, wherein the equal service applies constraints selected from the group consisting of:
a size of an insource job offer is equal to a size of the print job;
a deadline of an insource job offer is equal to a deadline of the print job;
a cost of an insource job offer is equal to a cost of the print job; and
a printer location of an insource job offer source is the printer location of the job source.

12. The method of claim 1, further comprising storing information on the at least one negotiation in memory accessible to the first negotiator.

13. The method of claim 12, further comprising at least one of:
storing information on negotiations with a plurality of other negotiators in memory accessible to the first negotiator and wherein each of the other negotiators has access to at least a portion of the information; and
storing information on a plurality of print job negotiations, for which the other negotiator has communicated insource offers, in memory accessible to at least the other negotiator.

14. The method of claim 1, further comprising:
utilizing an allocate service for identifying printers which are priority candidates for insourcing.

15. The method of claim 1, further comprising:
allocating a time slot to at least a portion of a print job for which the other negotiator makes an offer; and
permitting multiple print jobs for which offers have been made by the other negotiator to be assigned to the same time slot.

16. The method of claim 1, further comprising:
where more than one agreement has been made for at least a portion of the print job, the first negotiator applying constraints to select one of the agreements.

17. The method of claim 1, further comprising:
where more than one agreement has been made for at least a portion of the print job, providing a user with alternative solutions for execution of the print job.

18. The method of claim 1, further comprising, executing the print job on the at least one printer to which the print job is redirected.

19. The method of claim 1, wherein the predetermined time period is a function of a deadline parameter of the print job.

20. A negotiation apparatus comprising:
a negotiator associated with a printer, the negotiator being capable of communicating with other negotiators, each associated with a respective printer in a network linking the printers, the negotiator being capable of negotiating a redirection of a print job from its associated printer to another of the printers, wherein the negotiator is configured for utilizing constraint services which ensure that constraints associated with an outsource request are met, each of the constraint services applying a different set of constraints, the constraint services comprising:
a split service which ensures that if the print job is split into sub-jobs, the print job is an exact composition of the sub-jobs,
an include service which enables an offer to be made by another negotiator for a portion of the print job prior to the job being split, and
an equal service which ensures that a print job is outsourced as a whole;
the negotiator comprising:
a memory storage device for storing information on a plurality of ongoing negotiations;
a processor, in communication with the memory storage device, which executes processing instructions for carrying out a negotiation in which a first negotiator seeks to outsource a print job, the instructions including instructions for:
when serving as the first negotiator, utilizing at least one of the constraint services to formulate an outsourcing request for execution of the entire print job, the outsource request including parameters of the print job expressed in a negotiation protocol and communicating the outsourcing request to at least one other negotiator;
when serving as one of the other negotiators, where the entire print job meets insourcing conditions, communicating a print job insource offer for execution of the entire print job to the first negotiator, expressed in the negotiation protocol, whereby an agreement is formed between the first negotiator and the other negotiator;
when serving as the one of the other negotiators, where a portion of the print job which is less than the entire print job meets insourcing conditions, communicating a print job insource offer for execution of the print job portion to the first negotiator, expressed in the negotiation protocol, in response to the outsourcing request;
when serving as the first negotiator, where the communicated insource offer is for only a portion of the print job, which is less than the entire print job, with the include service, ensuring that the insource offer meets constraints for being a sub-job of the print job; and
when serving as the first negotiator, where no print job insource offer for execution of the entire print job is communicated from the at least one other negotiator within a predetermined time period, modifying the outsourcing request to offer a split of the print job and communicating the modified outsourcing request from the first negotiator to at least one other negotiator, which takes into account the insource offer for the portion of the print job which was received in response to the outsourcing request, thereby enabling agreements to be made with the at least one other negotiator for sub-jobs of the job and redirection of the print job to at least one other printer of the plurality of printers with which an agreement has been made through negotiation with its negotiator.

21. A printing system comprising:
a plurality of printers which execute print jobs by printing on print media, the printers being capable of redirecting print jobs to other printers of the plurality of printers;
a respective negotiator associated with each of the printers capable of negotiating a redirection of a print job from its associated printer to another of the printers, wherein the negotiators are configured for utilizing constraint services which ensure that constraints associated with an outsource request are met, each of the constraint services applying a different set of constraints, the constraint services comprising:
a split service which ensures that if the print job is split into sub-jobs, the print job is an exact composition of the sub-jobs,
an include service which enables an offer to be made by another negotiator for a portion of the print job prior to the job being split, and
an equal service which ensures that a print job is outsourced as a whole;
the negotiators including memory storing instructions and a processor for executing the instructions, the instructions including instructions for:
when serving as a first negotiator, utilizing at least one of the constraint services to formulate an outsourcing request for execution of the entire print job, the outsource request including parameters of the print job expressed in a negotiation protocol, and communicating the outsourcing request to at least one other negotiator;
when serving as one of the at least one other negotiators, where the entire print job meets insourcing conditions, communicating a print job insource offer for execution of the entire print job to the first negotiator, expressed in the negotiation protocol, whereby an agreement is formed between the first negotiator and the other negotiator;
when serving as the one of the at least one other negotiators, where a portion of the print job which is less than the entire print job meets insourcing conditions, communicating a print job insource offer for execution of the print job portion to the first negotiator, expressed in the negotiation protocol, in response to the outsourcing request;
when serving as the first negotiator, where the communicated insource offer is for only a portion of the print job, which is less than the entire print job, with the include service, ensuring that the insource offer meets constraints for being a sub-job of the print job;
when serving as the first negotiator, where no print job insource offer for execution of the entire print job is communicated from the at least one other negotiator within a predetermined time period, modifying the outsourcing request to offer a split of the print job and communicating the modified outsourcing request from the first negotiator to at least one other negotiator, which takes into account the insource offer for the portion of the print job which was received in response to the outsourcing request, thereby enabling agreements to be made with the at least one other negotiator for sub-jobs of the job and redirection of the print job to at least one other printer of the plurality of printers with which an agreement has been made through negotiation with its negotiator.

22. A non-transitory article of manufacture, the article comprising a computer readable medium which stores instructions for conducting at least one negotiation for the redirection of a print job between a first negotiator associated with a first printer of a plurality of printers and at least one other negotiator associated with another of the plurality of printers, the negotiators each being configured for utilizing constraint services which ensure that constraints associated with an outsource request are met, each of the constraint services applying a different set of constraints, the constraint services comprising:
 a split service which ensures that if the print job is split into sub-jobs, the print job is an exact composition of the sub-jobs,
 an include service which enables an offer to be made by another negotiator for a portion of the print job prior to the job being split, and
 an equal service which ensures that a print job is outsourced as a whole;
 the instructions including instructions for:
  utilizing at least one of the constraint services to formulate an outsourcing request for execution of the entire print job for the first negotiator, the outsource request including parameters of the print job expressed in a negotiation protocol;
  communicating the outsourcing request from the first negotiator to the at least one other negotiator;
  where the entire print job meets insourcing conditions, communicating a print job insource offer for execution of the entire print job to the first negotiator from the other negotiator, expressed in the negotiation protocol, whereby an agreement is formed between the first negotiator and the other negotiator;
  where a portion of the print job which is less than the entire print job meets insourcing conditions, communicating a print job insource offer for execution of the print job portion to the first negotiator from the other negotiator, expressed in the negotiation protocol, in response to the outsourcing request;
  where the communicated insource offer is for only a portion of the print job, which is less than the entire print job, with the include service, ensuring that the insource offer meets constraints for being a sub-job of the print job;
  where no print job insource offer for execution of the entire print job is communicated to the first negotiator from the at least one other negotiator within a predetermined time period, modifying the outsourcing request to offer a split of the print job and communicating the modified outsourcing request from the first negotiator to at least one other negotiator, which takes into account the insource offer for the portion of the print job which was received in response to the outsourcing request, thereby enabling agreements to be made with the at least one other negotiator for sub-jobs of the job and redirection of the print job to at least one other printer of the plurality of printers with which an agreement has been made through negotiation between its negotiator and the first negotiator.

* * * * *